(12) United States Patent
Juang et al.

(10) Patent No.: US 9,277,492 B2
(45) Date of Patent: Mar. 1, 2016

(54) ENHANCEMENT TO PLMN SELECTION PROCESS WHILE ROAMING

(75) Inventors: Ben-Heng Juang, Milpitas, CA (US); Qin Zhang, Mountain View, CA (US); Ravi Ayyappan, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 530 days.

(21) Appl. No.: 13/560,929

(22) Filed: Jul. 27, 2012

(65) Prior Publication Data

US 2014/0031033 A1    Jan. 30, 2014

(51) Int. Cl.
| | |
|---|---|
| *H04W 8/10* | (2009.01) |
| *H04W 8/18* | (2009.01) |
| *H04W 8/02* | (2009.01) |
| *H04W 48/18* | (2009.01) |
| *H04W 8/12* | (2009.01) |

(52) U.S. Cl.
CPC ............... *H04W 48/18* (2013.01); *H04W 8/02* (2013.01); *H04W 8/10* (2013.01); *H04W 8/12* (2013.01); *H04W 8/18* (2013.01)

(58) Field of Classification Search
CPC ........... H04W 4/02; H04W 4/04; H04W 4/06; H04W 4/10; H04W 4/12
USPC .......................................................... 455/452
See application file for complete search history.

(56) References Cited

U.S. PATENT DOCUMENTS

| | | | |
|---|---|---|---|
| 6,603,968 B2 * | 8/2003 | Anvekar et al. ................ | 455/433 |
| 6,625,132 B1 | 9/2003 | Boettger et al. | |
| 7,525,936 B2 | 4/2009 | Buckley et al. | |
| 7,953,410 B2 * | 5/2011 | Alfano et al. .............. | 455/435.2 |
| 8,270,966 B1 * | 9/2012 | Vargantwar et al. .......... | 455/423 |
| 8,977,263 B2 * | 3/2015 | Chin et al. ................. | 455/435.3 |
| 2008/0146223 A1 | 6/2008 | Welnick et al. | |
| 2008/0261603 A1 * | 10/2008 | Sever et al. ................... | 455/445 |
| 2009/0215447 A1 | 8/2009 | Catalano et al. | |
| 2010/0267383 A1 * | 10/2010 | Konstantinou et al. .... | 455/435.2 |
| 2011/0177810 A1 | 7/2011 | Kim | |
| 2012/0077495 A1 * | 3/2012 | Kim et al. .................. | 455/435.1 |

\* cited by examiner

*Primary Examiner* — Asghar Bilgrami
(74) *Attorney, Agent, or Firm* — Downey Brand LLP (57) ABSTRACT

A method and apparatus for a mobile wireless device configured to adaptively scan for a preferred wireless network while roaming is described. In one embodiment, at least a portion of a database including characteristic information regarding wireless networks can be stored within the mobile wireless device. Network characteristic information can include mobile country codes, mobile network codes, location area codes and cell-IDs. When the mobile wireless device is connected to a network that is not a preferred network, the mobile wireless device can use the database information in conjunction with characteristics from a connected wireless network to determine when to scan for the preferred wireless network.

25 Claims, 8 Drawing Sheets

ENHANCEMENT TO PLMN SELECTION PROCESS WHILE ROAMING

FIELD OF THE DESCRIBED EMBODIMENTS

The described embodiments relate generally to wireless communications and more particularly to searching for and selecting a preferred public land mobile network (PLMN) while roaming on another PLMN.

BACKGROUND

Mobile wireless communications systems are deployed extensively. These vast wireless networks can provide extensive coverage for a user with a mobile device such as a cellular telephone, personal digital assistant or other mobile device that can connect to and exchange voice and data information. The wireless networks can be arranged by providers such that a particular provider may be responsible for a particular wireless network. Any one particular network can be referred to as a public land mobile network (PLMN). Typically, any one particular mobile wireless device can connect to one of several PLMNs. The mobile wireless device can have a preferred PLMN oftentimes referred to as a home PLMN (HPLMN). The HPLMN can be a network that can provide wireless services to the user of a mobile wireless device for the lowest cost. For example, the HPLMN can be the network associated with a provider through which the user can have purchased the mobile wireless device and can services the region that the user most frequently operates the mobile wireless device.

As the mobile wireless device moves beyond the coverage area of the HPLMN, the mobile wireless device can connect to other PLMNs to continue to receive service. For example, a user can travel from a home region with a HPLMN to foreign country. The foreign country may have other compatible PLMNs that can support the users' mobile wireless device. These other PLMNs can service the user's mobile wireless device, but oftentimes the service provided to a visiting mobile wireless device can require an additional service fee to be paid to the provider of the PLMN. When a users' mobile wireless device connects to a PLMN that is not a HPLMN, the other networks is often referred to as a visited PLMN (VPLMN).

Since connecting to a VPLMN can accrue additional service fees, the user can desire the mobile wireless device to search for and connect to a preferred network or HPLMN as soon as possible. The search for a HPLMN is not without drawbacks, however. For example, the mobile wireless device can be configured to automatically scan for and connect to a HPLMN when roaming (i.e., when not connected to a HPLMN). However, such an automatic selection configuration can cause the mobile wireless device to periodically scan for a HPLMN. If the wireless device has moved to a region where the HPLMN do not exist, such as a distant foreign country, then the periodic scans can needlessly consume battery power. One alternative is to configure the mobile wireless device to manually connect to different network PLMNs when roaming (manual selection). While this configuration can save battery power, if the user forgets to connect to the HPLMN, the user can be responsible for significant roaming fees, particularly if a VPLMN exists near the users' normal operating region.

Therefore, what is desired is a reliable way to identify and avoid those operating conditions where a mobile wireless device can connect to a PLMN and unnecessarily scan for a preferred PLMN, adversely affecting battery life. Prompt detection of a preferred PLMN should be enabled to allow the mobile wireless device to switch to a HPLMN when possible.

SUMMARY OF THE DESCRIBED EMBODIMENTS

This paper describes various embodiments that relate to adapting a scanning for a home or preferred network by a mobile wireless device when the mobile wireless device is connected to a network.

A method for selecting a network by a mobile wireless device while the mobile wireless device is roaming can include the steps of associating the mobile wireless device with a wireless network that is not a home wireless network, storing network adjacency within the mobile wireless device, determining when the wireless network is nearby the home wireless network and scanning for the home wireless network.

In another embodiment, a mobile wireless device can include a wireless transceiver for transmitting and receiving wireless data to and from a wireless network, a memory for storing data a processor instructions, a processor configured to determine when a preferred wireless network is near to a currently connected wireless network by connecting to a wireless network other than the preferred wireless network, storing adjacency information for wireless network and scanning for preferred wireless networks next to the mobile wireless device in accordance with at least one characteristic of the connected wireless network and stored adjacency information.

A method for adaptively scanning for a home public land mobile network can include the steps of storing adjacency information in the mobile wireless device prior to operating the mobile wireless device away from the home public land mobile network, connecting to a public land mobile network, other than the home public land mobile network and scanning for the home public land mobile network in accordance with characteristics from the public land mobile network and the stored adjacency information.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION OF SELECTED EMBODIMENTS

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

In one embodiment, a mobile wireless device can maintain a one or more databases of network and geographic information regarding nearby networks within the mobile wireless device. In one embodiment, a first database can include information regarding country codes (i.e., mobile country code, MCC) and one or more PLMNs. A second database can include information associating networks (PLMNs) and location area codes (LAC), mobile network codes (MNC) and cell-ID. When the mobile wireless device is connected to a PLMN (a visited PLMN or VPLMN), a first determination can be made to determine if a scan for a HPLMN should be provided. In one embodiment, this determination can be done in accordance with data in the first database and a current country code from a serving cell. If the device determines that a scan for a HPLMN should be provided, then data from the second data base can be used to further refine that determination.

In one embodiment, the first database can be stored in the device prior to roaming from the HPLMN. In another embodiment, the second database can be updated with data from a location server, in some cases while the device is roaming. For example, the location server can respond to a query from the mobile wireless device by providing information (MCC, MNC, LAC and cell-ID, for example) regarding networks and cells adjacent to and nearby a position of the mobile wireless device.

If a HPLMN is determined to be nearby to the mobile wireless device, then the mobile wireless device can scan for and connect to the HPLMN if automatic network selection is enabled. In another embodiment, if a HPLMN is determined to be nearby, then the mobile wireless device can notify the user that such a network is available, when the mobile wireless device is configured for manual network selection. In some embodiments an equivalent HPLMN (EHPLMN) can be selected instead of a HPLMN.

Figure 1:
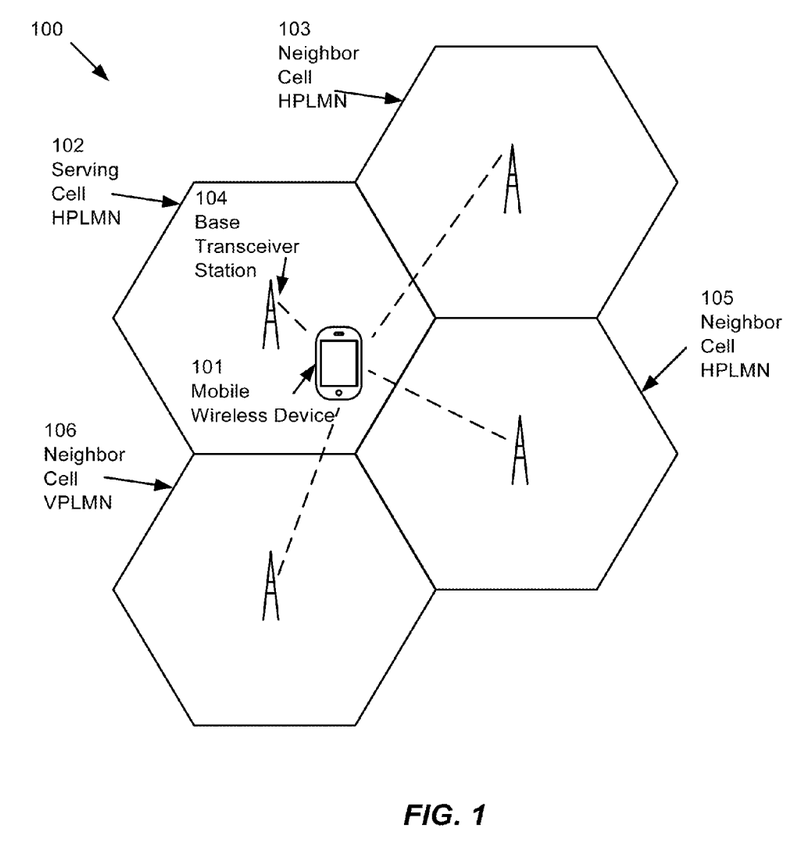
FIG. 1 is a diagram of a mobile wireless device operating in the presence of multiple PLMNs.

FIG. 1 is a diagram 100 of a mobile wireless device 101 operating in the presence of multiple PLMNs. The mobile wireless device 101 can be connected to (camped on) serving cell 102. In the example, serving cell 102 is served by base transceiver station 104. Also in this example, serving cell 102 is a member of mobile wireless devices' 101 HPLMN. Neighbor cell 103 and neighbor cell 105 are also members of the HPLMN. Thus, wireless device 101 can move to neighbor cell 103 or neighbor cell 105 and can still connect with the HPLMN. On the other hand, neighbor cell 106 is not a member of the HPLMN, therefore if the mobile wireless device 101 were to operate in the bounds of neighbor cell 106, then the mobile wireless device 101 can be required to connect to a network (such as VPLMN). As described above, connecting to a network other than a HPLMN may incur additional operating costs.

The diagram 100 of FIG. 1 illustrates one scenario associated with operating a mobile wireless device 101 in a network, other than a HPLMN, but the scenario is presented in a very simplified manner. Oftentimes, neighboring cells can be served by a common network. More frequently, however, the mobile wireless device 101 can travel a relatively large distance before connecting to a PLMN that is not a HPLMN. This scenario is illustrated in FIG. 2.

Figure 2:
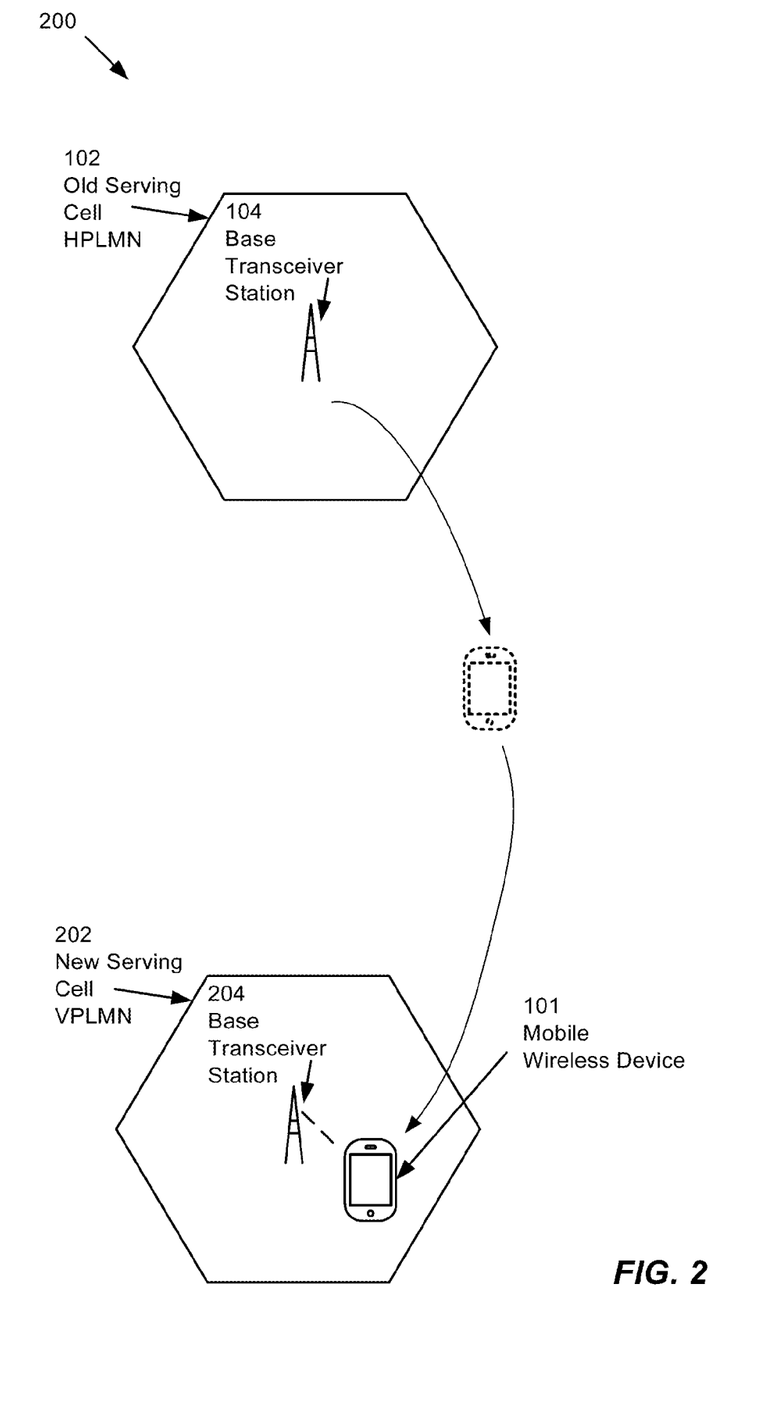
FIG. 2 is a diagram of mobile wireless device connected to a new serving cell.

FIG. 2 is a diagram 200 of mobile wireless device 101 connected to a new serving cell 202. In this example, mobile wireless device 101 was initially connected to old serving cell 102. Old serving cell 102 can be associated with a HPLMN. Next the user can move mobile wireless device 101 a large distance such as may occur when the user travels by plane to a different country. After the displacement, mobile wireless device 101 can connect to new serving cell 202. In this example, new serving cell 202 can be served by a different PLMN (VPLMN). Since mobile wireless device 101 has connected to a VPLMN, the mobile wireless device 101 typically will periodically scan for a nearby HPLMN. The periodic scans, however, will be fruitless in this case, since there are no HPLMNs nearby the mobile wireless device 101. The battery life of the mobile wireless device 101 can be impacted by the constant, periodic network scans. One way to avoid the periodic network scans is to configure the mobile wireless device 101 to manually connect to PLMNs. The manual setting can cause the mobile wireless device 101 to cease scanning and remain connected to the VPLMN. However, when mobile wireless device 101 returns to old serving cell 102, if the device is set to manually connect to PLMNs, then the mobile wireless device 101 may not have any service until the user manually scans for nearby networks and connects to the HPLMN. Or alternatively, as shown in FIG. 1, the mobile wireless device can remain connected to a VPLMN, even when nearby to one or more HPLMNs.

Figure 3A:
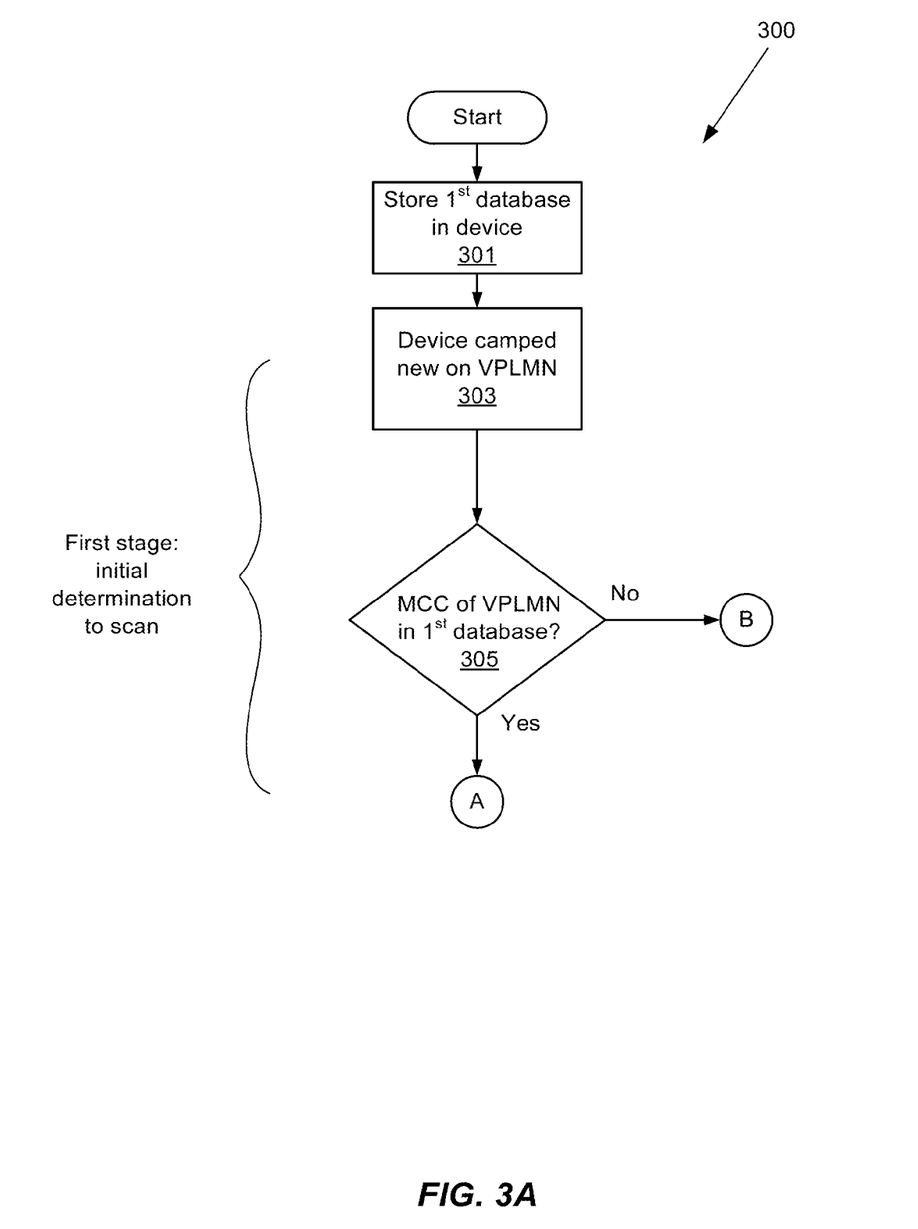
FIGS. 3A and 3B illustrate a flow chart of method steps for performing an adaptive PLMN scan, in accordance with one embodiment of the specification.
Figure 3B:
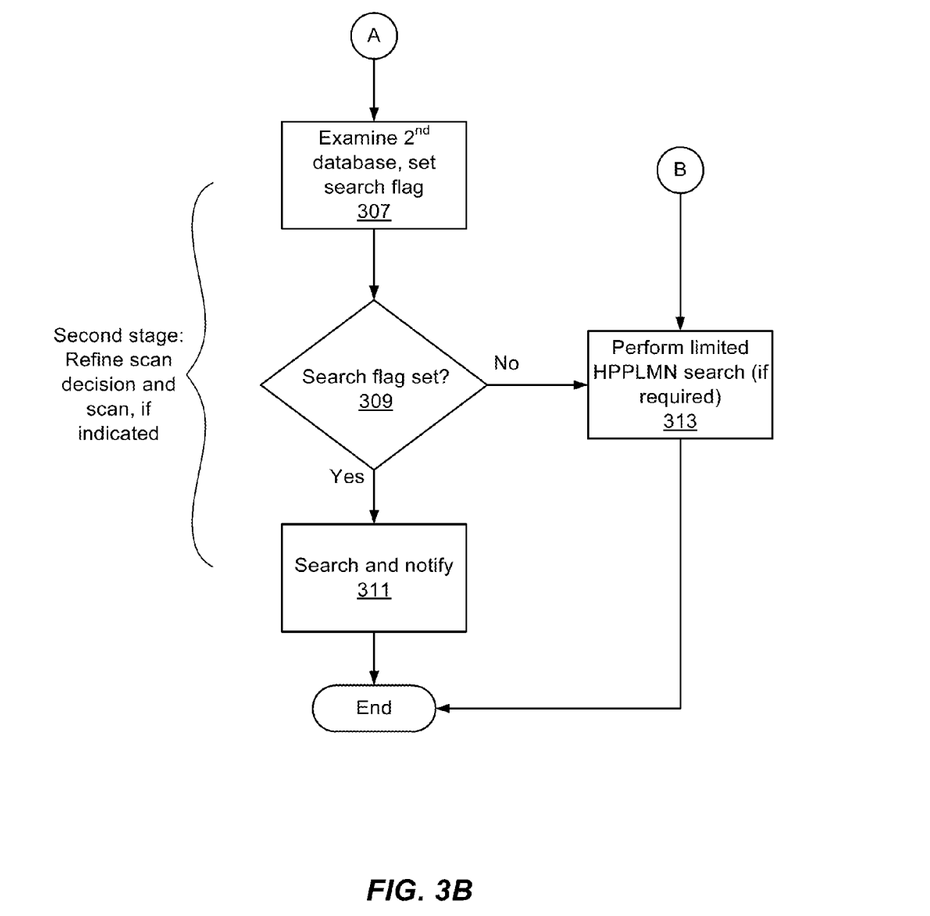

The shortcomings illustrated by FIG. 1 and FIG. 2 can be addressed, at least in part, by adaptively scanning for a presence of nearby PLMNs that can be either a HPLMN or a EHPLMN. This can be described in FIG. 3A and FIG. 3B. FIG. 3A and FIG. 3B are flow charts of method steps 300 for performing an adaptive PLMN scan, in accordance with one embodiment of the specification. Persons skilled in the art will understand that any system configured to perform the method steps in any order is within the scope of this description. The method begins in step 301 where at least a portion of a first database is stored in the mobile wireless device 101. The first database can include information regarding country codes (MCC) and their associated networks (PLMNs). In another embodiment, the first database can link MCC-PLMN information to adjacent or nearby MCCs. For example, the first database can associate one or more PLMNs with one or more MCCs. In yet another embodiment, the first database can be refreshed periodically, such as every two weeks. In step 303, the mobile wireless device 101 can camped on a new VPLMN. In this step, the mobile wireless device 101 can determine that the device is currently connected to a PLMN that is not a HPLMN or an EHPLMN. In step 305, the mobile wireless device 101 can determine if the MCC of the VPLMN is included in the first database stored in the device. If the MCC of the VPLMN is included in the first database, the mobile wireless device 101 can be operating near a HPLMN. Conversely, if the MCC of the VPLMN is not included in the first database, then mobile wireless device 101 may not be operating near a HPLMN. Returning to step 305, if the MCC of the VPLMN is not included in the database, then in step 313 (FIG. 3B), the mobile wireless device can perform a limited high priority PLMN (HPPLMN) search. In one embodiment, the HPPLMN search can be scan for particular PLMN networks in accordance with a priority set forth in a user controlled PLMN list and/or an operator controlled PLMN list. In some conditions, the mobile wireless device 101 may determine that the HPPLMN scan can be unnecessary. For example, the mobile wireless device 101 can determine that a prior HPPLMN search has determined that there are no HPLMNs nearby and the device has determined that the position of the device has not substantially changed.

Returning to step 305, if the device determines that the MCC of the VPLMN is included in the first database, then in step 307, the device can examine the second database. Data included in the second database can include adjacency information that can be used to determine if a HPLMN can be nearby or adjacent to the mobile wireless device 101. The device can determine a state of a "perform-search" flag that can indicate that a scan should be provided to determine if a HPLMN can be nearby and can be used by the mobile wireless device 101. In some embodiments, the second database information can be updated in this step, particularly if information regarding the VPLMN is absent from the second database and the mobile wireless device 101 has a data connection. In step 309 the state of the perform-search flag can be examined. If the perform-search flag is not set then the method can proceed to step 313. On the other hand, if the perform-search flag is set, then in step 311 a network scan can be performed and when a HPLMN is located and when manual network selection is chosen by the user, the user can be notified that a HPLMN can be selected for use and the method ends. In cases when automatic network selection has been selected by the user, the HPLMN can be selected and the method ends.

One embodiment of the adaptive PLMN scanning method described in FIGS. 3A and 3B can be described in more detail by dividing the method into two parts. A first stage can include steps 301, 303, and 305. A second stage can include steps 307, 309, 311 and 313. The first stage is described in more detail in FIG. 4A, while the second stage is described in more detail in FIGS. 4B and 4C.

Figure 4A:
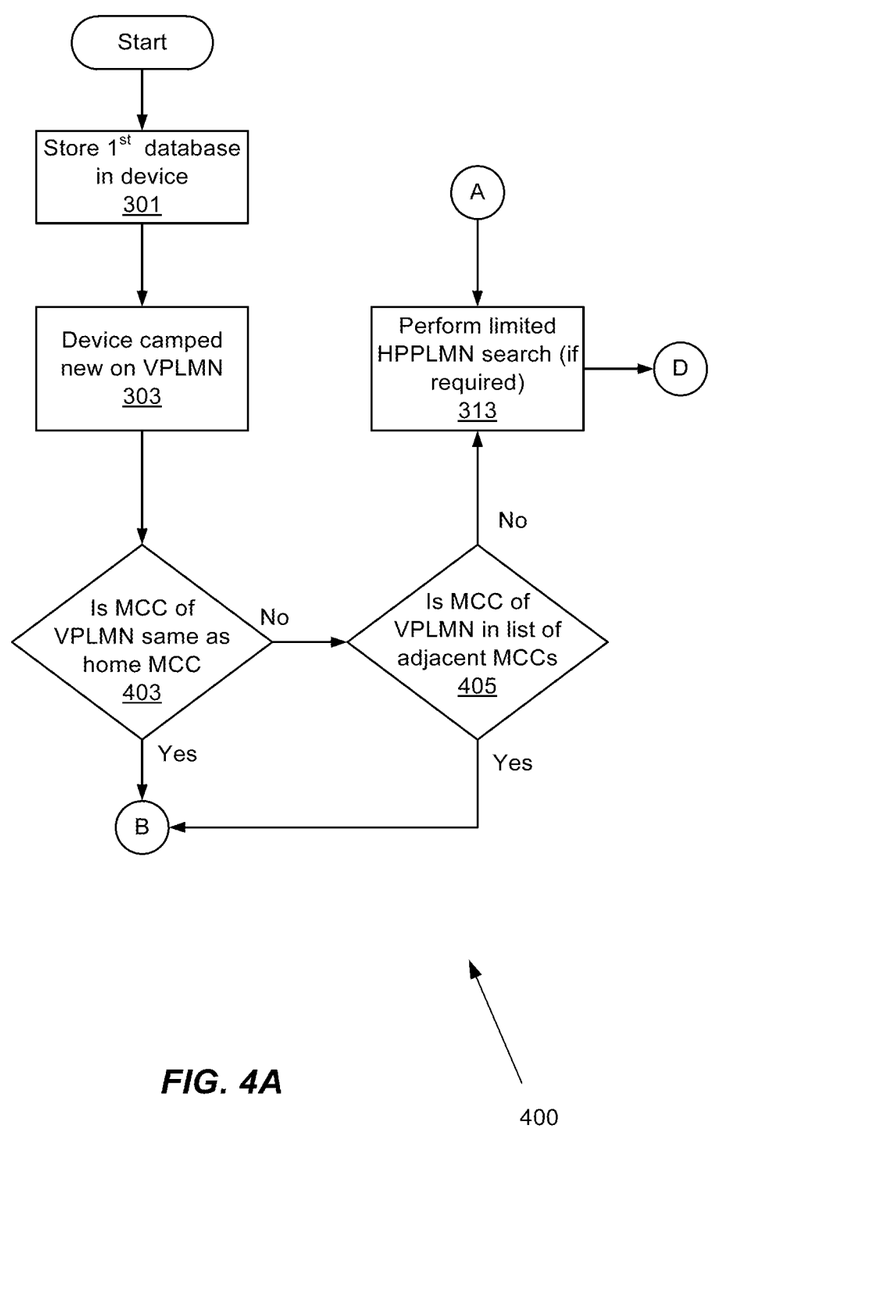
FIGS. 4A, 4B and 4C illustrate a flow chart of method steps for adaptively scanning for a network, in accordance with one embodiment of the specification.
Figure 4B:
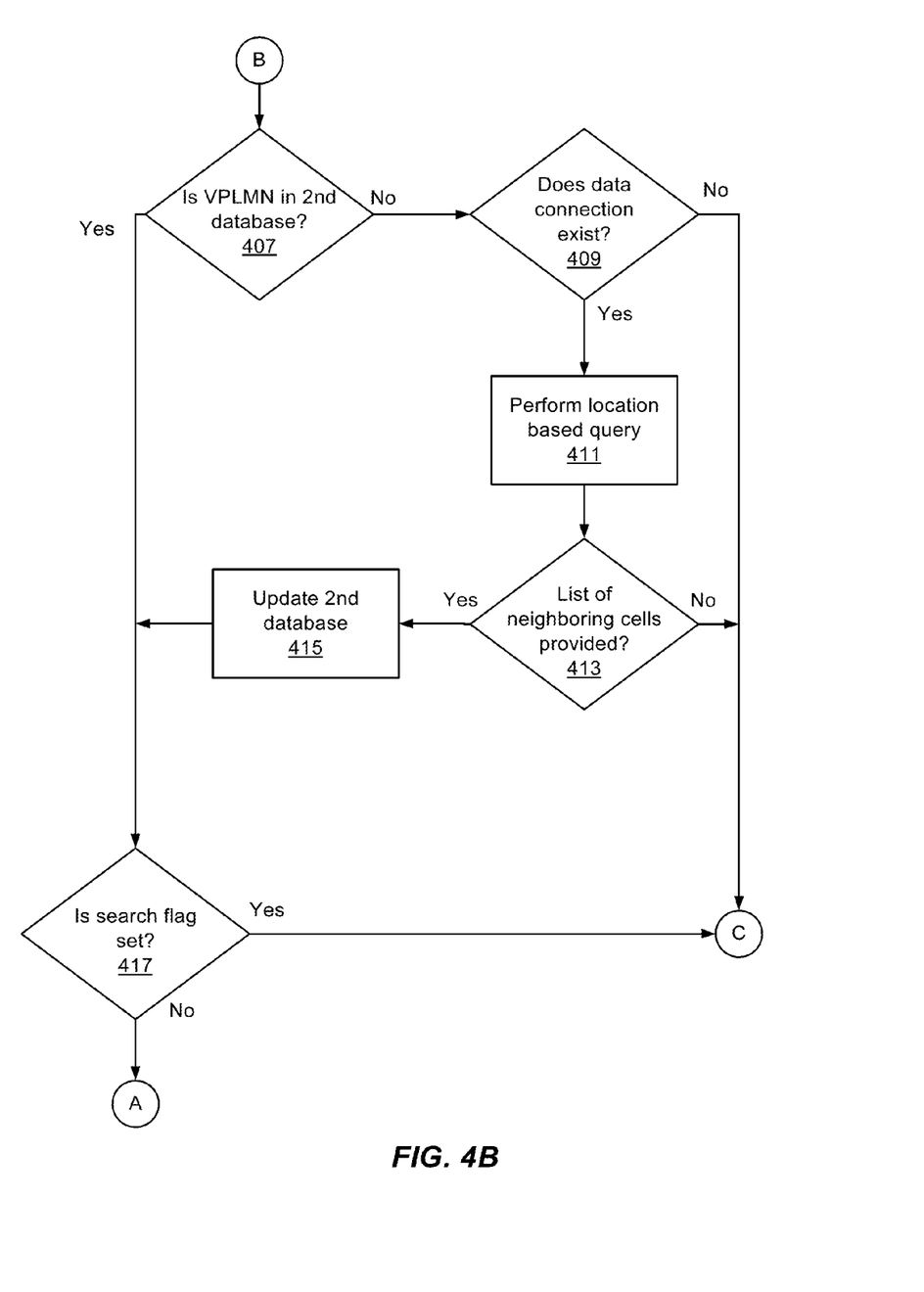

FIGS. 4A, 4B and 4C illustrate a flow chart 400 of another embodiment of method steps for adaptively scanning for a network, in accordance with one embodiment of the specification. The first stage of the present method (shown in FIG. 4A) can provide a first determination regarding if a network scan for a HPLMN should be provided. Steps 301 and 303 can be substantially similar to same numbered steps described in FIG. 3A. Thus in step 301, at least a portion of the first database is stored in the mobile wireless device 101. In step 303, the mobile wireless device 101 can camp on a VPLMN. In step 403, the MCC of the VPLMN currently in use can be compared to the MCC of the HPLMN. If the country code of the VPLMN is the same as the country code of the HPLMN, then the mobile wireless device 101 can determine that an adaptive network scan can be provided. Many times, if the country code of the current network matches the country code of the HPLMN, then the mobile wireless device 101 can be near a HPLMN. Therefore, returning to step 403, if the MCC of the VPLMN is the same as the MCC of the HPLMN, then the method proceeds to step 407 of FIG. 4B. On the other hand, if the MCC of the VPLMN is not the same as the MCC of the HPLMN, then in step 405, the MCC of the VPLMN is compared to a list of MCCs that can be adjacent or proximate to the HPLMN as determined by the first database stored in the mobile wireless device 101. In one embodiment, data included in the first database can be used to determine if the currently indicated country code can be associated (linked) to a PLMN that can be a HPLMN. Thus, if the MCC of the VPLMN is not on the list of MCCs that can be adjacent or proximate to the HPLMN, then in step 313, the device can perform a limited HPPLMN search as described in conjunction with FIG. 3B and the method ends. On the other hand, if the MCC of the VPLMN is determined to be adjacent or near the MCC of the HPLMN, then the method proceeds to step 407 of FIG. 4B.

Figure 4C:
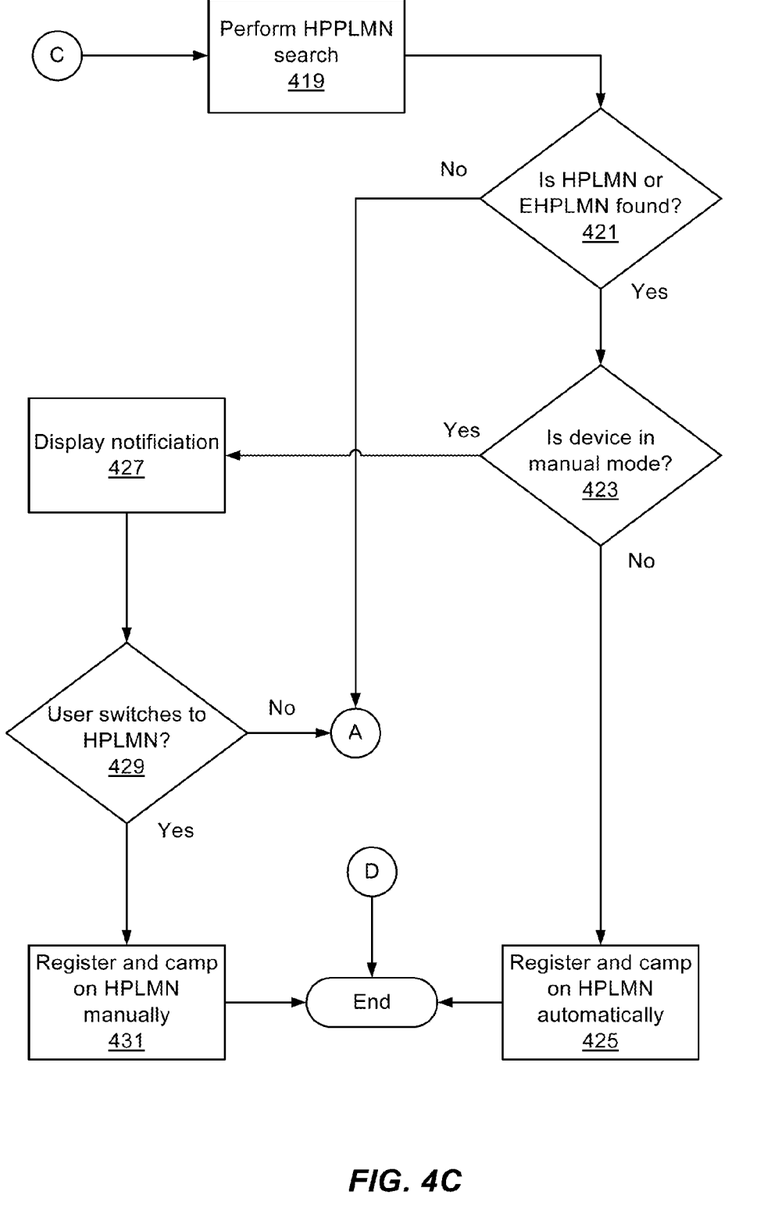

FIGS. 4B and 4C describe the second stage of the adaptive PLMN scanning method described in FIG. 3. The second stage can refine a decision to provide an adaptive network scan, provide the network scan and act upon the scan results. In step 407, the second database also stored in the mobile wireless device 101 can be examined to see if any information regarding the current VPLMN is included in the database. As described above, the second database can include adjacency information that can be used to determine if a HPLMN is nearby or adjacent to the mobile wireless device. More particularly, the second database can correlate location information such as LAC, MNC and cell-ID with one or more PLMNs. In one embodiment, the mobile wireless device 101 can examine location information of the current VPLMN and together with the data included in the second database determine if a HPLMN can be nearby. In one embodiment, at least a portion of the second database can be stored in mobile wireless device prior to roaming away from the HPLMN.

Returning to step 407, if there is information in the second database related to the VPLMN, particularly information suggesting that proximate to the VPLMN there may be a HPLMN, then a perform-search flag can be set and the method proceeds to step 417. On the other hand, if there is no data related to the VPLMN in the second database, then in step 409, the mobile wireless device 101 can check for the existence of a data connection. If there is no data connection, then the method can proceed to step 419 in FIG. 4C. On the other hand, if there is a data connection, then in step 411, the mobile wireless device 101 can submit a location based query to a location server. The location server can provide data for the second database that can be missing with respect to a current copy of the second database in mobile wireless device 101. In one embodiment, the location server can provide MMC, MNC, LAC and cell-IDs of networks and cells nearby the mobile wireless device 101. In some embodiments, the second database can be periodically updated with data from the location server.

Next in step 413, the mobile wireless device 101 can determine if new data for the second database was received. If no new data was received then the method can proceed to step 419 in FIG. 4c. On the other hand, if new data was received, then in step 415 the new data can be examined to determine if an adaptive scan should be performed. For example, if there is information in the updated second database suggesting that there can be a HPLMN nearby, then in response, the mobile wireless device can set the perform-search flag. In another embodiment, data from the location server can include a determination of whether an adaptive scan should be performed. For example, a state setting of the perform-search flag can be included with the data. In other words, in one embodiment the location server can determine if a search should be provided while in another embodiment, the device can determine if a search should be provided. The method can proceed to step 417 where the device examines the state of the perform search flag. If the perform search flag is not set, then the method can return to step 313 in FIG. 4A and the device can perform a limited HPPLMN scan. On the other hand, if the perform-search flag is set, then the method can proceed to step 419 in FIG. 4C.

In step 419 in FIG. 4C, the mobile wireless device and perform a scan for a HPPLMN. In one embodiment, the device can scan for a HPLMN or an EHPLMN. In step 421, if the HPLMN or an (EHPLMN) is not found, then the method returns to step 313 in FIG. 4A. On the other hand, if the HPLMN or EHPLMN is found, then in step 423 the PLMN selection mode for the mobile wireless device 101 is determined. If the mobile wireless device 101 is not configured to be in a manual PLMN selection mode (i.e., the mobile wireless device 101 is configured for automatic PLMN selection), then in step 425, the mobile wireless device 101 can register and camp on the HPLMN or EHPLMN and the method ends. On the other hand, if the mobile wireless device 101 is configured to be in a manual PLMN selection mode, then in step 427 the mobile wireless device 101 can display a notification to indicate to the user that a HPLMN has been located. In step 429, if the user does not select the HPLMN, then the method returns to step 313. On the other hand, if the user does select the HPLMN, then in step 431 the user can select the HPLMN or EHPLMN and manually and the method ends.

The adaptive PLMN scanning method set forth in FIG. 3 and FIGS. 4A-4C can advantageously enhance battery life by scanning for a HPLMN only when there is a likelihood that a HPLMN may be near to the mobile wireless device 101. Also, the adaptive scanning method can be applied when the mobile wireless device 101 is configured for either automatic or manual PLMN selection.

Figure 5:
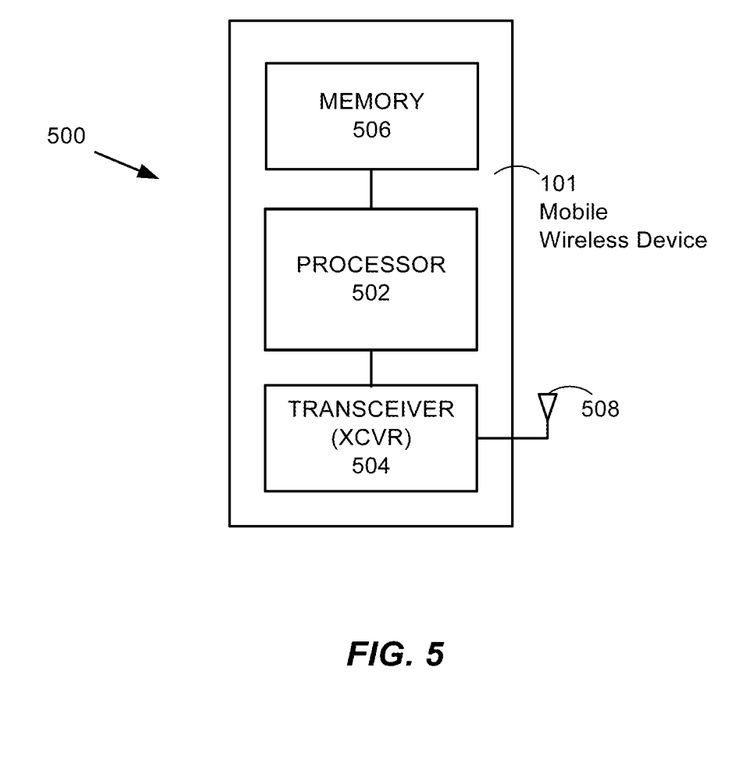
FIG. 5 is a block diagram of a mobile wireless device, in accordance with one embodiment of the specification.

FIG. 5 is a block diagram 500 of a mobile wireless device 101, in accordance with one embodiment of the specification. Mobile wireless device 101 can include a processor 502 coupled to memory 506 and also coupled to a wireless transceiver 504. Processor 502 can be configured to read, write and execute processor instructions stored in memory 506. Processor 502 can also be configured to control wireless transceiver 504. In one embodiment, wireless transceiver 504 can connect to networks PLMNs such as HPLMNs and VPLNMs through antenna 508.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method of network selection by a mobile wireless device while roaming on a visited wireless network, the method of network selection comprising:
    storing, at least in part in the mobile wireless device, network adjacency information, comprising a first database and a second database, for wireless networks, while the mobile wireless device is connected to a home wireless network;
    roaming from the home wireless network to the visited wireless network;
    connecting the mobile wireless device to the visited wireless network;
    determining from the first database that a country code of the visited wireless network matches a country code of the home wireless network or that the visited wireless network is adjacent to the home wireless network;
    searching the second database to determine whether the home wireless network is adjacent to the visited wireless network; and
    scanning for the home wireless network when the home wireless network is adjacent to the visited wireless network based on the search of the second database.

2. The method of claim 1, wherein the first database comprises country code information for wireless networks, and the second database comprises location area code, mobile network code and cell-ID information for wireless networks.

3. The method of claim 1 further comprising:
    updating the second database based on data obtained from a location server, while the mobile wireless device is roaming on the visited wireless network.

4. The method of claim 2, further comprising:
    performing a limited high priority network search when the country code information for the visited wireless network is not included in the first database.

5. The method of claim 4, wherein the limited high priority network search is performed for a particular public land mobile network (PLMN) network in accordance with a priority specified in a user controlled PLMN list or in an operator controlled PLMN list.

6. A method for adaptively scanning for a home wireless network, by a mobile wireless device while roaming on a visited wireless network, the method for adaptively scanning for the home wireless network comprising:
    prior to roaming on the visited wireless network, storing a first database and a second database of network adjacency information correlating country code information and network identifiers at least in part in the mobile wireless device;
    roaming on the visited wireless network;
    determining from the first database of network adjacency information that a country code of the visited wireless network matches a country code of the home wireless network or that the visited wireless network is adjacent to the home wireless network; and
    scanning for the home wireless network, while roaming on the visited wireless network when the mobile wireless device determines based on the second database that the home wireless network is adjacent to the visited wireless network.

7. The method of claim 6, wherein the second database of network adjacency information includes location area code, mobile network code and cell-ID information of wireless networks.

8. The method of claim 7, further comprising updating the second database of network adjacency information when an identifier of the visited wireless network is not included in the second database of network adjacency information.

9. The method of claim 8, further comprising updating the second database of network adjacency information when a data connection exists between the mobile wireless device and a wireless network.

10. The method of claim 9, further comprising:
locating the home wireless network; and
notifying a user of the mobile wireless device that the home wireless network is available when the mobile wireless device is configured to manually connect to a network.

11. The method of claim 9, further comprising;
locating the home wireless network; and
automatically connecting to the home wireless network when the mobile wireless device is configured to automatically connect to a network.

12. A mobile wireless device, configured to roam on a non-preferred wireless network, comprising:
a transceiver for transmitting data to and receiving data from wireless networks;
a memory for storing data and processor instructions; and
a processor configured to determine when a preferred wireless network is proximate to a currently connected non-preferred wireless network by:
connecting to the non-preferred wireless network,
storing network adjacency information comprising a first database and a second database for wireless networks at least in part in the mobile wireless device, and
determining from the first database that a country code of the non-preferred wireless network matches a country code of the preferred wireless network or that the non-preferred wireless network is adjacent to the preferred wireless network; and
scanning for the preferred wireless network, while roaming on the non-preferred wireless network when the mobile wireless device determines based on the second database that the preferred wireless network is adjacent to the non-preferred wireless network.

13. The mobile wireless device of claim 12, wherein the processor is further configured to scan for the preferred wireless network when the processor determines based on the network adjacency information whether the preferred wireless network is adjacent to the non-preferred wireless network.

14. The mobile wireless device of claim 12, wherein the processor is further configured to connect the mobile wireless device to the preferred wireless network when the preferred wireless network is located during the scanning and the mobile wireless device is configured to automatically connect to a network.

15. The mobile wireless device of claim 12, wherein the processor is further configured to notify a user of the mobile wireless device when the preferred wireless network is located during the scanning.

16. The mobile wireless device of claim 12, wherein the processor is further configured to query a location server to update the network adjacency information stored at least in part in the mobile wireless device.

17. A method for adaptively scanning for a home public land mobile network (HPLMN) by a mobile wireless device, while roaming on a visited public land mobile network (VPLMN), the method for adaptively scanning comprising:
prior to operating the mobile wireless device away from the HPLMN, storing network adjacency information comprising a first database and a second database at least in part in the mobile wireless device;
connecting to the VPLMN;
determining from the first database that a country code of the VPLMN matches a country code of the HPLMN or that the VPLMN is adjacent to the HPLMN;
scanning for the HPLMN, while roaming on the VPLMN, when the mobile wireless device determines that the HPLMN is adjacent to the VPLMN based on a search of the second database; and
performing a limited high priority network search when the mobile wireless device determines that the HPLMN is not adjacent to the VPLMN based on the search of the second database.

18. The method of claim 17, further comprising periodically updating network adjacency information stored in the mobile wireless device.

19. The method of claim 18, wherein updates to the network adjacency information is provided by a location server.

20. The method of claim 17, further comprising:
notifying a user of the mobile wireless device when the HPLMN is found during the scanning and the mobile wireless device is configured for manual network selection;
comparing the country code of the VPLMN with the country code of the HPLMN; and
scanning for the HPLMN when the country code of the VPLMN matches the country code of the HPLMN.

21. A non-transitory computer-readable medium storing program code that, when executed by a processor of a mobile wireless device having a transceiver and memory, causes the mobile wireless device to:
store network adjacency information comprising a first database and a second database of at least in part in the memory of the mobile wireless device;
connect the mobile wireless device to a non-preferred network that comprises a visited network, wherein a preferred network comprises a home network;
determine from the first database that a country code of the non-preferred network matches a country code of the preferred network or that the non-preferred network is adjacent to the preferred network; and
scan for the preferred network, while roaming on the non-preferred network when the mobile wireless device determines based on the second database that the preferred wireless network is adjacent to the non-preferred wireless network.

22. The non-transitory computer-readable medium as recited in claim 21, wherein execution of the program code further causes the mobile wireless device to:
update the network adjacency information stored in the memory of the mobile wireless device when information related to the non-preferred network is missing from previously stored network adjacency information.

23. The method of claim 1, further comprising scanning for the home wireless network when the first database indicates that the country code for the visited wireless network matches the country code for the home wireless network or when the country code for the visited wireless network is included in a list of adjacent country codes.

24. The method of claim 1, wherein the mobile wireless device determines based on the second database that the home wireless network is adjacent to the visited wireless network by correlating network adjacency information of the second database for one or more public land mobile networks.

25. The non-transitory computer-readable medium as recited in claim 21, wherein the mobile wireless device determines based on the second database that the preferred wireless network is adjacent to the non-preferred wireless network by correlating network adjacency information of the second database for one or more public land mobile networks, and wherein the second database comprises location area code, mobile network code and cell-ID information for wireless networks.

\* \* \* \* \*